(12) United States Patent
Lippard

(10) Patent No.: US 8,826,579 B2
(45) Date of Patent: Sep. 9, 2014

(54) UNITARY BARREL, CHAMBER AND ACTION FOR A FIREARM

(71) Applicant: Karl C. Lippard, Colorado Springs, CO (US)

(72) Inventor: Karl C. Lippard, Colorado Springs, CO (US)

(73) Assignee: Karl C. Lippard, Colorado Springs, CO (US)

( * ) Notice: Subject to any disclaimer, the term of this patent is extended or adjusted under 35 U.S.C. 154(b) by 0 days.

(21) Appl. No.: 13/720,570

(22) Filed: Dec. 19, 2012

(65) Prior Publication Data

US 2013/0118049 A1    May 16, 2013

Related U.S. Application Data

(63) Continuation of application No. 12/832,170, filed on Jul. 8, 2010, now Pat. No. 8,365,647.

(60) Provisional application No. 61/225,781, filed on Jul. 15, 2009.

(51) Int. Cl.
F41A 21/16 (2006.01)

(52) U.S. Cl.
CPC ..................................... *F41A 21/16* (2013.01)

USPC ........................................... 42/76.1; 89/14.05

(58) Field of Classification Search
CPC .......... F41A 21/00; F41A 21/16; F41A 21/20
USPC .......... 42/76.01, 76.02, 76.1; 89/15, 16, 14.7, 89/14.8, 14.05
See application file for complete search history.

(56) References Cited

U.S. PATENT DOCUMENTS

| | | | | |
|---|---|---|---|---|
| 2,901,814 A | * | 9/1959 | Sullivan | 42/78 |
| 3,159,903 A | * | 12/1964 | Eves | 89/14.8 |
| 3,609,904 A | * | 10/1971 | Scanlon | 42/76.01 |
| 7,707,761 B2 | * | 5/2010 | Bojalad et al. | 42/76.1 |
| 2004/0154210 A1 | * | 8/2004 | Bennett et al. | 42/90 |

* cited by examiner

Primary Examiner — Stephen M Johnson
(74) Attorney, Agent, or Firm — Martensen IP

(57) ABSTRACT

A unitary barrel, chamber and bolt region for a firearm is manufactured from a single piece of metal stock so as to precisely and consistently meet headspace requirements. A single piece of metal stock having a bore centerline is successively reamed based on a common datum to achieve precise headspace compliance. The unitary assembly is then profiled, again based on measurements from the datum, to provide a unitary barrel, chamber and bolt region without any form of juncture, headspace or harmonic limitations.

7 Claims, 5 Drawing Sheets

UNITARY BARREL, CHAMBER AND ACTION FOR A FIREARM

RELATED APPLICATION

The present application is a continuation of and claims the benefit of priority from U.S. patent application Ser. No. 12/832,170, filed on Jul. 8, 2010, now U.S. Pat. No. 8,365,647, issued on Feb. 5, 2013, which is hereby incorporated by reference in its entirety for all purposes as if fully set forth herein. The present applicant also claims priority to U.S. Provisional Application No. 61/225,781, filed on Jul. 15, 2009.

BACKGROUND OF THE INVENTION

1. Field of the Invention

Embodiments of the present invention relate, in general, to manufacturing processes of firearms and more particularly to the manufacturing of a combined barrel, chamber and action from a unitary piece of material.

2. Relevant Background

Fundamentally a firearm includes a barrel, a chamber and an action. A barrel typically includes an integral chamber which receives and supports a cartridge casing during firing. Cartridge sizes are identified by a standard specification defined by commercial standards organizations. A firearm intended for a particular caliber ammunition is manufactured so as to have chamber dimensions designed to accept the specified cartridge with clearances to ensure reliable functioning under expected operating conditions. Prior art chambers are formed with chambering reamers. A chambering reamer is a precision cutting tool made from tool steel or similar material that expands the diameter of the barrel bore to form the chamber. Forming a chamber with a reamer usually requires at least three successive cuts using at least three custom made reamers. This method is expensive and time-consuming. Furthermore, as is known to one skilled in the art of metallurgy, the reaming process cold-works the barrel, inducing stress which must be removed through heat treatment, which adds to the cost of production. Moreover, a chambering reamer depends on centering the cut on a pilot hole, which extends into the bore of the barrel, thus degrading concentricity of the chamber with respect to the bore if metal chips are allowed to build up in the pilot hole.

Once a chamber has been fashioned within the barrel, the barrel must be attached to an action. As is well known to one skilled in the relevant art, the action (also referred to herein as the bolt body) accepts a bolt, which serves to position and secure the cartridge in the chamber. According to techniques well known in the prior art, a barrel, with an integral chamber, is coupled to a separately existing action component. Typically this coupling is accomplished by screwing the barrel into the action. Once the barrel is attached to the action, a gauge is inserted to measure the distance between the bolt and the end of a theoretical cartridge that would reside inside the chamber. The distance between the end of the bolt and a cartridge is known to one skilled in the art as the headspace. Headspace in the manufacturing of a bolt action firearm is critical. If there is not enough headspace the cartridge will not properly fit inside the chamber and the bolt cannot be secured for firing. Conversely, if there is too much headspace the reliability of firing a cartridge will suffer as will accuracy of the weapon. Moreover, excessive headspace can create a dangerous situation.

According to one method of firearm manufacturing as known in the prior art, the determination of headspace as a critical manufacturing specification is addressed by using a headspace guide. A headspace guide consists of a go and a no-go gauge. The go and no-go gauges are cartridge like devices that fit within the chamber to measure headspace. The go gauge is slightly smaller in length than the no-go gauge. The difference in the two is the acceptance headspace variance. With the barrel and chamber attached to the action, the bolt is retracted in the action and a go gauge is inserted into the chamber. The bolt is then closed into the action thus pushing the go gauge into the chamber. If the bolt closes with the go gauge inserted into the chamber there is sufficient headspace. The bolt is then retracted and the go gauge is removed from the chamber. Next a no-go gauge is inserted into the action. The no-go gauge is slightly longer than the go gauge. Again, the bolt is pushed forward inserting the no-go gauge into the chamber. The inability of the bolt to close confirms that there is not excessive headspace. If the bolt closes with the no-go gauge inserted in the chamber then there is too much headspace creating a dangerous situation. The difference between the go gauge and no-go gauge is the maximum allowable headspace for the particular type of weapon.

While testing for proper headspace is relatively simple, correcting inadequate or excessive headspace is easier said than done. If there is inadequate headspace, the barrel is typically removed from the action and the length of the barrel is reduced as the length of the chamber is deepened by using a reamer. The barrel is once again attached to the action and the go gauge reinserted to test for sufficient headspace. Alternatively, the bolt face can be adjusted. While conceptually simple, these modifications are time-consuming and expensive.

To correct excessive headspace, the distance between the end of the bolt and end of the cartridge must be reduced. While the overall length of the barrel and chamber could be redesigned, a more likely approach to correcting excessive headspace is to increase the length of the bolt. As is known to one skilled in the relevant art, to correct excessive headspace by modifying the barrel, the barrel must be removed from the action and a portion of the end of the barrel, where the barrel attaches to the action, removed. Thus, as the barrel is again attached to the action, the cartridge sits slightly deeper in the action and headspace is reduced. With the newly dimensioned barrel attached to the action, the go gauge is again inserted into the chamber to verify that sufficient headspace exists. Thereafter the no-go gauge is inserted to verify that excessive headspace has been eliminated. This process may occur several times before an acceptable headspace is achieved.

The verification and sometimes correction of headspace is conducted on each weapon in the manufacturing process. This process is tedious and time consuming as well as expensive. The need therefore exists for a process to create a unitary barrel, chamber and action assembly opening eliminating the need for headspace correction. These and other improvements to the prior art are described below by way of example.

SUMMARY OF THE INVENTION

A unitary barrel, chamber and action assembly for a firearm is manufactured from a single piece of metal stock so as to precisely and consistently meet headspace requirements. A single piece of metal stock having a bore with a centerline is successively reamed based on a common datum to achieve precise headspace compliance. The unitary assembly is then profiled, again based on measurements from the datum, to provide a unitary barrel, chamber and action assembly without any form of juncture, headspace or harmonic limitations.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
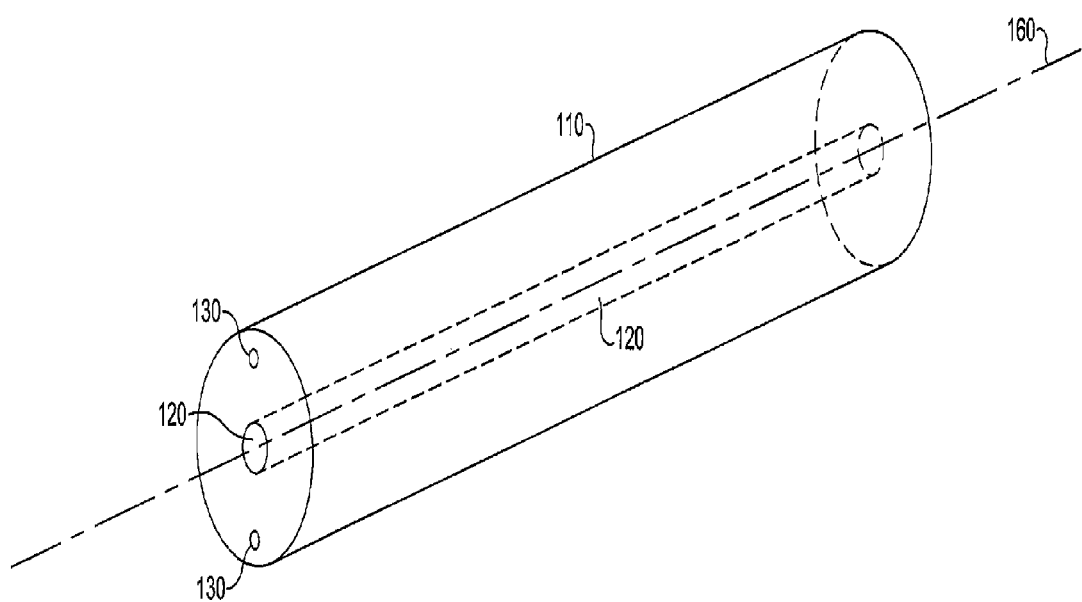
FIG. 1 is a perspective view of a piece of metal stock comprising a bore throughout its length according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A unitary barrel, chamber and action assembly for firearm and associated manufacturing methodology is hereafter described by way of example. Utilizing a single piece of metal stock, a plurality of concentrically oriented bores are reamed into the metal stock based off a common datum. By establishing a datum concentrically oriented to the barrel bore, the chamber and action can be configured from a single piece of stock. Using this single piece construction methodology, headspace requirements are precisely complied with at the time of manufacturing thus eliminating the need to validate and verify the juncture between the barrel and action, as is commonly found in the prior art. Moreover a unitary design eliminates structural defects, inaccuracies and stresses induced by the joining of the barrel to the action.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Included in the description are flowcharts depicting examples of the methodology which may be used to manufacture a unitary barrel, chamber and bolt body assembly for a firearm. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

As previously described, headspace is a distance measured from the part of the chamber that stops forward motion of a cartridge to the face of the bolt. If a headspace is too short, ammunition may not chamber correctly. If a headspace is too large, the cartridge case may rupture, possibly damaging the firearm or possibly injuring the shooter. Headspace measurements vary between various types of cartridges.

Most small cartridges have a flange or rim at the base of the case. A component of the firearm called an extractor hooks onto the rim to pull the spent case out of the chamber after it has been fired. The cartridge is said to be rimmed when the rim is of a larger diameter than the remainder of the case. The rim thus prevents the cartridge from moving too far into the barrel.

A cartridge can also be rimless if an extractor groove is machined into the body of the case so that the rim is of the same diameter of the adjacent part of the case. Most modern automatic weapons use rimless cartridges. The headspace of a rimless cartridge is based on the forward edge of the cartridge as it makes contact with an edge inside the bottlenecked portion or constricting portion of the chamber.

Variations in headspace, such that a firearm's headspace is either insufficient or excessive may have dramatic effects. When a round is touched off, many thousands of pounds of pressure are suddenly created forcing the base of the cartridge to the rear against the bolt face. The same amount of pressure is simultaneously exerted in a forward direction, some of it on the bullet or projectile, directing the down the bore with the remaining pressure pressing the interior of the case of the cartridge on to the chamber walls. The pressure stretches the forward part of the case tight against the shoulder of the chamber at the same time the rear of the case moves backwards towards the bolt face. If there is excessive headspace, the backward motion of the case provides too much room for expansion causing it to stretch too far and rupture. These effects can be catastrophic including directing the bolt to accelerate rearward and strike the user, shatter the action and/or bolt into fragments or cause the weapon to irreparably damage itself.

Accordingly, headspace tolerance of each weapon is verified prior to being placed in service. In conventional construction as would be known to one of ordinary skill in the art, go and no-go gauges are used to determine whether the headspace is sufficient, yet not excessive. The cause of this concern comes from the fact that the barrel, which includes the chamber, is attached to the action to which the bolt resides. Thus until this juncture is made, the actual headspace is indeterminative.

Embodiments of the present invention provide a common datum by which a headspace can be consistently manufactured into a unitary piece of metal stock thereby eliminating time-consuming and expensive verifications and corrections of headspace variance. Moreover, a unitary construction of the barrel, chamber and action provides substantial advantages with respect to strength, durability and reliability of the weapon.

FIG. 1 is a perspective view of a piece of metal stock that includes a bore disposed through its longitudinal axis according to one embodiment of the present invention. The crafting of a unitary barrel, chamber and action assembly for a firearm begins with the selection of the piece of metal stock. As would be known to one of ordinary skill in the relevant art, firearms can be manufactured from a number of different types of metal and/or composites. These materials include stainless steel, titanium, 416 stainless steel, 4340 or 4140 steel, S7 tool steel, and the like. According to one embodiment of the present invention a blank piece of S7 tool steel 110 is marked with 2 or more index marks on the body of the blank. In this example, a set of two index marks 130 are positioned on either end of a cylindrical metal blank. In other embodiments of the present invention the index marks can be placed on the lateral sides of the metal blank and the metal blank, or a combination of lateral sides and ends, can be of other geometrical configurations. As shown in FIG. 1, a single bore 120 transposes the entire length of the metal blank 110 establishing what will become the bore of the barrel.

Figure 2:
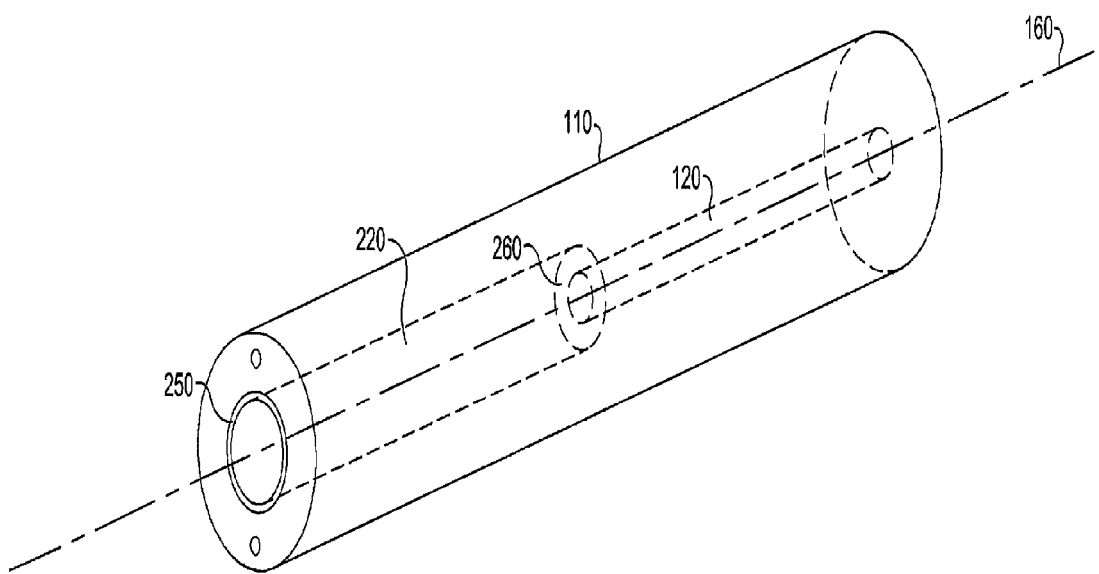
FIG. 2 is a perspective view of the piece of metal stock of FIG. 1 showing a plurality of concentrically oriented bores comprising unitary assembly including a barrel and an action according to one embodiment of the present invention.

FIG. 2 shows a perspective view of a metal blank possessing a plurality of concentrically oriented bores according to one embodiment of the present invention. As with FIG. 1, FIG. 2 includes a metal bore 120 that travels the entire length of the metal stock 110. One end of the metal stock, the diameter of a portion of the initial bore 120 is increased forming what will become an action or what is also referred to as the bolt body 220. The bolt body 220 is formed by successively reaming the initial bore 120 to a second, larger diameter. The juncture between a larger bolt body 220 and the initial bore 120 is referred to as the forward action face 260. In one embodiment of the present invention, the forward action face 260 is flat and orthogonally oriented to longitudinal centerline 160 of the bolt body 220 and of the bore 120.

As can be appreciated by one of ordinary skill in the art, reaming is a process to make existing holes dimensionally more accurate and to improve surface conditions. Reamers can be both machine and hand driven and be of varied sizes and configurations. By comparison a hole drilled by a twist drill may not possess a precision diameter or finished surface for many applications. Reaming generally removes a small amount of material, referred to in the art as an allowance, between what is drilled and the final diameter. The value may be less than 0.005 inches in hard materials such as S7 tool steel as used in one embodiment of the present invention. Reaming also removes a thin layer of stressed metal that can be formed by the drilling process. Thus post reaming the mechanical properties of the metal are restored to approximate their theoretical values minimizing the effects of tooling. One skilled in the art will recognize that the dimensional variations between the bore, chamber and action are significant. In most cases excess material is first removed by a conventional drilling process followed by precision reaming to bring the component into the required specifications. Attenuated successive reaming can methodically enlarge the bore without stressing the underlying metal.

According to one embodiment of the present invention, the depth of the bolt body 220 must be sufficient to provide for subsequent machining and profiling of the exterior portions of the firearm. The length of the piece of metal stock 110 must also be sufficient to house the combined components of the barrel, chamber and action as well as provide enough material for the stock 110 to be secured in machinery operable to drill, ream the holes and profile the exterior and other fixtures.

In addition to reaming the initial bore 120 to form the action assembly 220 a datum 250 is reamed into the metal blank 110 to provide a central and common reference point for all subsequent modification and configuration operations. According to one embodiment of the present invention, the datum 250 is a rim reamed into the metal blank 110 from which depth measurements of subsequent reaming can be based. The datum 250 shown in FIG. 2 is positioned at one end of the metal stock 110 and is of minimal depth. However the depth of the datum cut can vary based on manufacturing requirements and the specification of the metal stock 110 in comparison to the final unitary assembly dimensions. And while the present embodiment shows a concentric rim as the datum, other geometric configurations are contemplated and within the scope of the present invention.

In one embodiment the rim or datum 250, as shown in FIG. 2, has a diameter larger than the diameter of the bolt body 220 and that is concentrically oriented about the centerline 160 of the metal stock 110. This datum serves as a common reference point from which all subsequent modifications to the assembly, both internal and external, are made.

Figure 3:
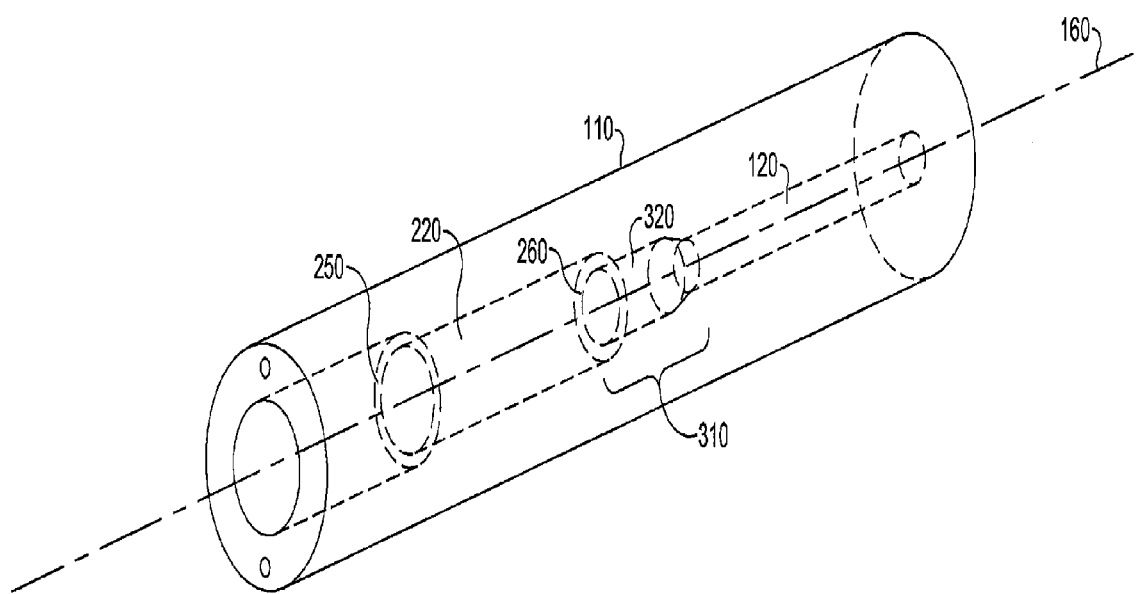
FIG. 3 is a perspective view of a piece of metal stock of FIG. 2 showing a plurality of concentrically oriented bores of a assembly including a barrel, action and chamber according to one embodiment of the present invention.

FIG. 3 is a perspective view of the unitary piece of metal stock of FIG. 2 with concentric bores comprising the barrel, chamber and action assembly opening according to one embodiment of the present invention. As with the configuration of the metal stock 110 shown in FIG. 2, a primary bore 120 along the centerline 160 serves as a reference to longitudinally guide additional cuttings. Once the action assembly opening 220 has been drilled and/or reamed a forward action face 260 exists at the juncture of the action assembly opening 220 and the bore 120. The depth of the action assembly opening 220 and thus the positioning of the forward action face 260 and bolt (not shown), which is housed within the action assembly opening 220, is determined from the datum 250. Note that in this depiction the datum is substantially displaced from the end of the metal stock 110. As long as there is sufficient material with which to form the unitary assembly, the depth of the datum is immaterial to the functionality of the invention. It should also be noted that the datum, according to one embodiment, is configured to be within the final dimensions of the unitary assembly allowing for later modifications to the action assembly opening 220, chamber 320 and bore 120.

Using the datum 250 as a reference, the diameter of a portion of the bore 120 is increased to form a chamber 320. The diameter of the chamber 320 is larger than that of the bore 120 so as to receive a cartridge. The diameter of the chamber 320 is also less than that of the action assembly opening 220 so as to retain the forward action face 260 juncture between the action assembly opening 220 and the rear portion of the chamber 320. The chamber can be configured to accept various forms of cartridges, both rimmed and rimless, and to a specific caliber as required by a particular set of requirements.

For implementations in which rimless cartridges are used the general measurement of the headspace 310 is from where the cartridge makes frontal contact in the chamber, such as a necking of the chamber or a ridge, and the forward face of the bolt. Similarly for rimmed cartridges the rim is used to secure the cartridge in the chamber with the headspace being the distance from that point back to the forward face of the bolt.

The bolt resides within the action assembly opening 220 of the firearm and is secured by locking lugs 225. Assuming the bolt is of a consistent length, the positions of the locking lugs 225 determine the position of the forward face of the bolt and any space between the forward face of the bolt and the forward action face 260.

Recall that conventional weapons are assembled by forming a bore and drilling/reaming the chamber in that bore. Thereafter that bore/chamber component is affixed to a bolt body. Typically this is by screwing the barrel into the bolt body. Since the two components are independently manufactured, and each component includes one of the measuring points that define the headspace, the resulting headspace formed by the combined bolt body, barrel and chamber must be verified after the two parts are joined. If the headspace is found to be outside of acceptable limits, the chamber and/or bolt face configuration/juncture must be modified.

In the present invention, each ream of the original bore is based off a common datum 250. By doing so, precise measurements with respect to the depth of each cut can be made creating a chamber/forward action, locking lugs and forward bolt face juncture, i.e. headspace, that is consistently accurate and reliable. Using the common datum of the present invention, the positioning of the chamber 320 with respect to that of the forward bolt face as measured from the datum 250 can ensure that the headspace 310 is consistently manufactured to provide sufficient space for the cartridge yet not so much space that it would exceed tolerances.

Once the headspace has been defined by the reaming of the chamber 320 and action assembly opening 220, other features of the unitary assembly can be fashioned including locking lugs, feeder ramp, ejection port, aiming indexes and the like. As each of these (and other) features are based off a common datum 250, variances induced by piece-mill construction are eliminated.

Moreover the unitary design eliminates any juncture induced stresses. For example fashioning of a mating surface between the bolt body and barrel, as would be common in the prior art, would cold-work the metal inducing residual stress in the material. Thus the material would not possess its inherent strength and durability and the design would have to compensate for that deficiency. In addition, a mechanical screw juncture or mechanical interlocking juncture would possess a certain degree of instability. As the firearm is in use, vibrations will occur that, over time, will affect the security of that juncture. Harmonics, vibration and other stresses can induce inaccuracies that will lead to a less efficient and inaccurate weapon.

In many cases in the prior art the material used to fashion the action assembly opening is dissimilar from that of the barrel. One challenge resolved by the unitary assembly is that of differing coefficients of thermal expansion. As the weapon is fired, it is well known that the temperature of the barrel will rise due to the discharge of the explosive and the friction induced by the bullet as it travels the length of the barrel. The barrel will thus expand according to the material's coefficient of thermal expansion. Some of that heat will convectively transfer to the action assembly opening. If the coefficient of thermal expansion of the action assembly opening is not identical to that of the barrel, the two components will expand and contract at different rates and over differing amounts. The difference in expansion/contraction may impart additional stress on the juncture between the two components or may destabilize the juncture significantly enhancing the weapon's susceptibility to vibration stress and harmonic considerations. Additionally, the transfer of heat between the barrel and action assembly opening in a two piece design is by way of convection heat transfer. While using this type of heat transfer is effective, it is never as efficient as a unitary piece of metal.

A unitary design having a homogenous composition barrel, chamber and action assembly opening eliminates any coefficient of thermal expansion factors as well as any juncture induced inaccuracies or stresses. As these stresses and inaccuracies are eliminated, a more efficient design can be utilized. Indeed much of the robustness of the designs of the prior art are based on the need to compensate for harmonic induced vibration as result of an inefficient juncture between the bolt body and barrel. Embodiments of the present invention enable weapon designers to craft and consistently manufacture a firearm that is reliable, accurate, lightweight and yet durable for its intended application.

Figure 4:
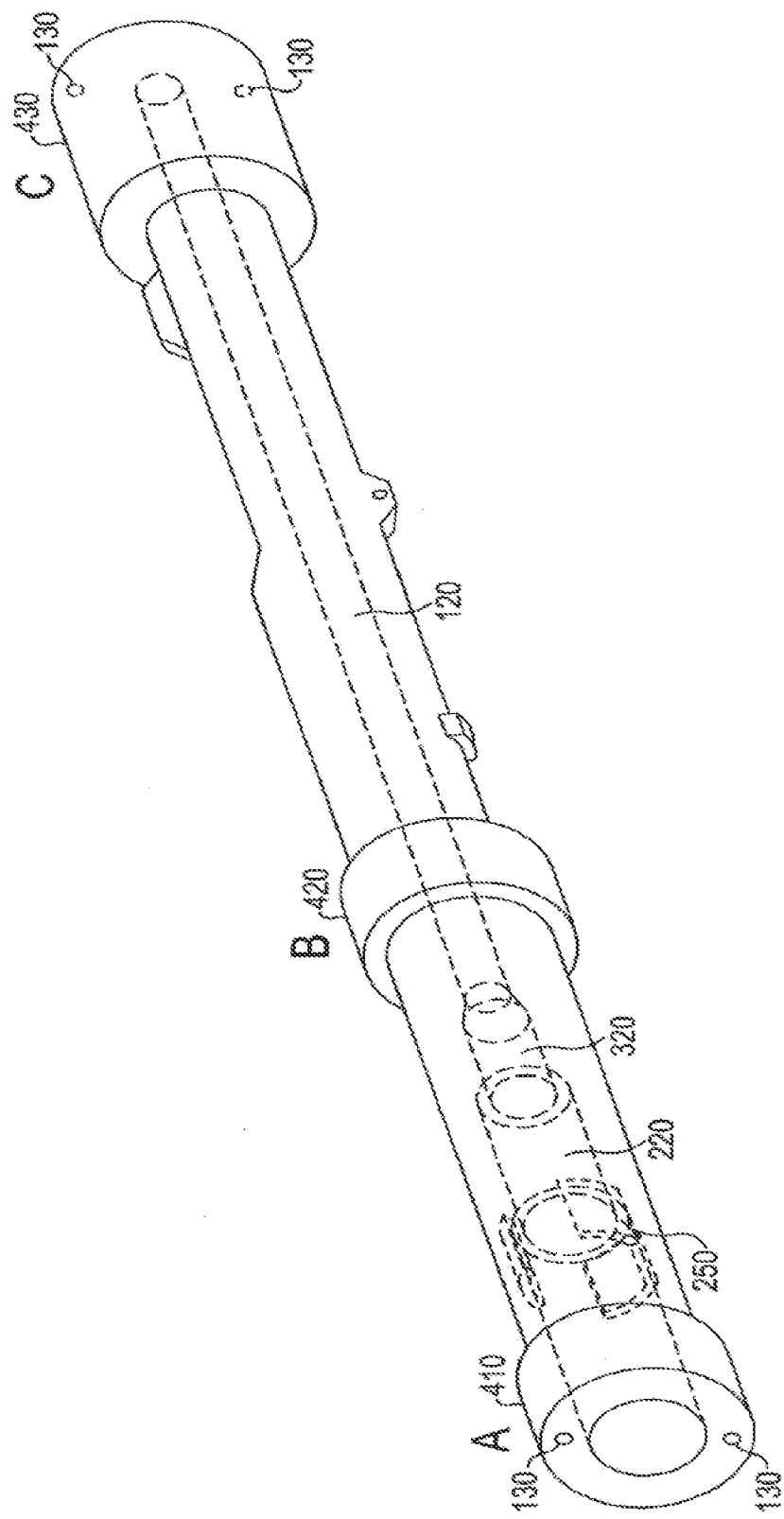
FIG. 4 is a perspective view of a piece of metal stock of a unitary assembly depicting exterior profiling according to one embodiment of the present invention.

Once the unitary barrel, chamber and action assembly opening are internally fashioned, the remaining portions of the assembly can be profiled. FIG. 4 is a perspective view of the unitary assembly manufactured according to one embodiment of the present invention, with exterior portions of the steel blank profiled away. In the embodiment shown the set of two index marks 130 is repeated on the opposite end of the metal stock 110 so as to allow the piece of metal to be placed in profiling machinery. In other embodiments the index marks can be located on the lateral portions of the metal stock and can vary in number, location and orientation.

The view shown in FIG. 4 includes the datum 250, the action assembly opening 220, chamber 320 and the bore 120. In this embodiment three fixture locations 410, 420, 430 are used to hold the blank as the exterior portions of the assembly are configured. Using the index marks 130 and the datum 250, the exact position of components such as the ejector port, feed ramp, sights, mounts and so forth can be fashioned into the piece of metal. Eventually the middle fixture 420 is removed leaving the assembly held in place by two fixtures 410, 430. At the completion of the manufacturing process the mounting fixtures 410, 430 are removed leaving the unitary assembly.

One aspect of the present invention is that the datum, by which all internal and external measurements are based, remains with the finished product. Since the datum is present, subsequent modifications to the bolt body, chamber, locking lugs and bore are possible. According to one embodiment of the present invention, a unitary assembly of an established configuration can be modified to accept a different type or size of cartridge having a different configuration of action and/or a different bore diameter. Each of these modifications can be made without reducing the accuracy and interactions of the exterior profiling as each was based off of the same datum.

The integral nature of producing a barrel from a unitary piece of metal stock according to the present invention adds significant strength and rigidity to the barrel. Furthermore a unitary barrel assembly can be re-rifled and the bore may be re-bored or have a sleeve reinserted.

According to another embodiment of the present invention, the unitary barrel, chamber and action assembly opening assembly can be fit into a plurality of receivers. By using a predetermined and standardized receiver, a plurality of different unitary assemblies can be utilized. While the prior art allows for the ability to interchange barrels to a common action assembly opening, it does so at the cost of accuracy and reliability. Since the barrel, chamber and action assembly opening are of a unitary construction in the present invention, interchanging them into a receiver does not alter their reliability or accuracy. Thus a single receiver can be configured to accept a plurality of unitary assemblies with varying configurations.

Figure 5:
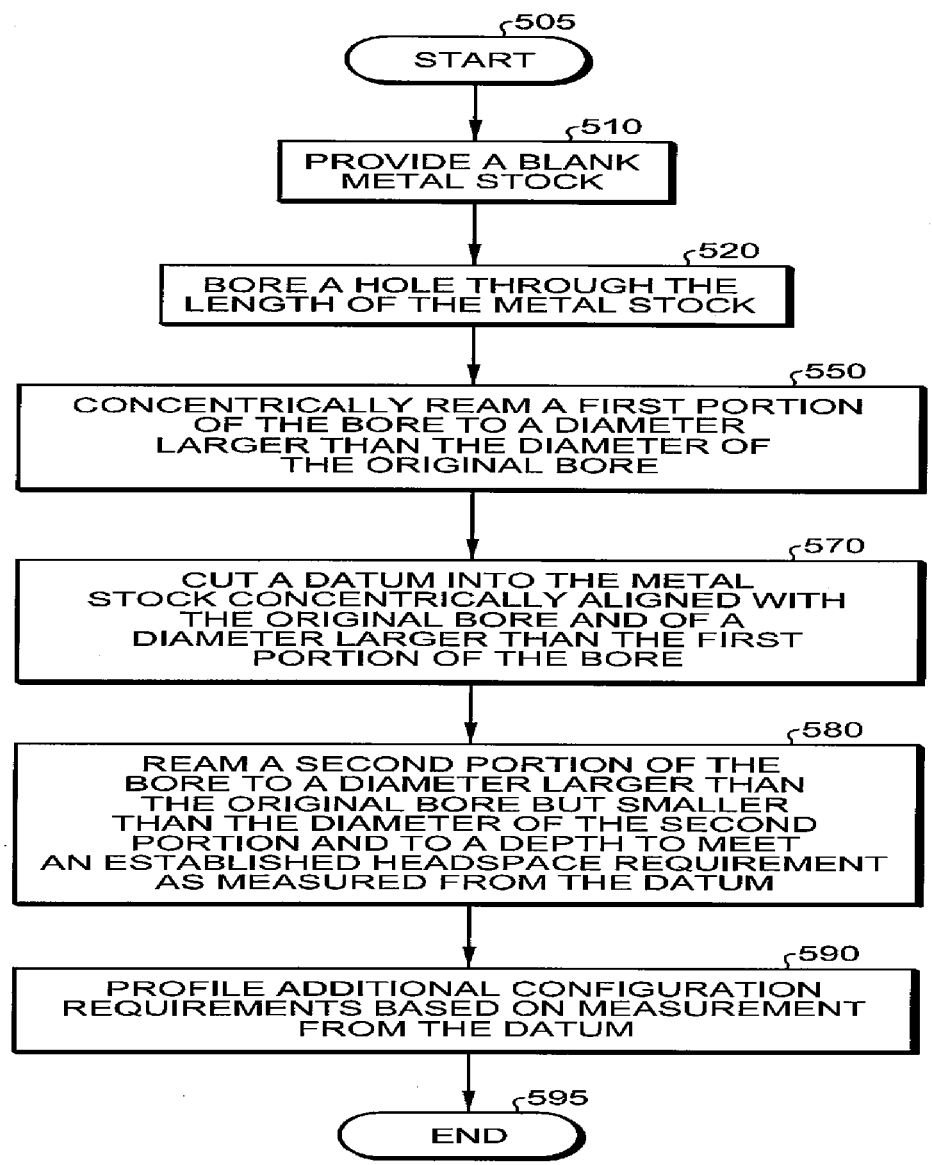
FIG. 5 is a flowchart of one method embodiment for manufacturing a unitary barrel, chamber and action assembly according to the present invention.

One method for manufacturing a unitary barrel, chamber and action assembly for a firearm is shown in the flowchart of FIG. 5. The process begins 505 with providing 510 a blank piece of metal stock. As previously stated, the blank metal stock can be of a variety of shapes and of a variety of types of suitable material. In a preferred embodiment the blank metal stock is cylindrical in shape and comprised of S7 tool steel. In other embodiments the shape and composition of the stock may vary without departing from the scope of the present invention.

Once the metal stock is selected a hole is bored 520 through the stock establishing what will be later known as the interior portion of the barrel. In one embodiment, index marks placed on each respective end of the stock piece of metal allow the metal stock containing the bore to be moved from one apparatus to another without losing the ability to precisely align the manufacturing tools to the axis of the bore.

With the primary bore established a bolt body can be formed by expanding a first portion of the bore to a larger diameter. This is done, according to one embodiment, by concentrically reaming 550 that portion of the bore until the desired diameter is achieved. The depth of such a portion is sufficient such that it can house the bolt and various other components needed for the functioning of the firearm at the conclusion of the manufacturing process. In other embodiments the excess material is first drilled to a dimension slightly less than that of the desired depth and diameter. Then as a final step the now enlarged hole is reamed to its final dimensions to ensure it is perfectly circular and that any residual tool stress in the metal is removed.

In conjunction with the establishment of the action assembly opening diameter or subsequent to its creation, a datum is cut 570 in to the first portion of the bore. The datum in one embodiment of the present invention is a rim or edge concentrically orientated about the centerline of the metal stock based on the original bore and positioned at the end of the action assembly opening, yet within the proposed dimensions of the unitary assembly. For example, where the action assembly opening includes locking lugs fashioned in the aft portion of that region, the datum would be immediately adjacent to and behind the locking lugs so that the datum is the first reference cut as viewed longitudinally from the end of the metal stock.

With a datum established, the diameter of a second portion of the original bore can be expanded to fashion the chamber. As with the first portion, part of the excess material can be removed by concentrically drilling the chamber as orientated to the original bore to slightly less than desired dimensions. Then the final material can be precisely removed by reaming 580 the second portion of the bore to achieve an accurate and precise configuration of the chamber, again concentrically orientated about the bore centerline. Alternatively, the bore can be successively reamed until the desired diameter is achieved.

As the reaming tools establish the diameter of the chamber, the depth of the chamber into the original bore is determined by measurements from the datum. Using the datum as a common reference point, the depth of the chamber can be compared to the depth of the bolt. The junction between the beginning of the chamber and the forward end of the action assembly opening is known as the forward action face and, depending on the type of cartridge being used, the headspace can be defined as a function of the distance between the forward action face and some portion of the chamber. Recall that, ideally, the bolt, when secured by the locking lugs, would rest upon the forward action face. Using the datum from both reaming processes, an exact relationship between the forward action face and chamber, i.e. the headspace, can be created. Moreover since the headspace distance will be precisely known, the unitary assembly can eliminate the need to verify headspace compliance on each and every unitary assembly as is done in the prior art.

For example, if the headspace requirement for a high performance automatic weapon is 1.6355 inches as measured from the shoulder of the chamber to the bolt face (resting against the forward action face), and the bolt face has been established as being exactly 4.5000 inches from the datum, then when the chamber portion of the original bore is manufactured, the reaming tool can be set to engage the original bore to a depth of 6.1355 inches as measured from the datum to the shoulder of the chamber reamer. Upon reaching this depth the headspace will be exactly 1.6355 inches. Thus the headspace requirement can be met without having to expend additional man hours by verifying each barrel assembly with go and no-go gauges.

Once the chamber and bolt body have been fashioned within the piece of metal stock, additional configuration requirements can be profiled 590 to complete 595 the process. Each of these additional components such as the bolt locking lugs, aiming sights, ejector port, feeding ramp and the like, is based off measurements from the datum. This provides for a quick, efficient and precise manufacturing of a unitary barrel, chamber and action assembly.

Embodiments of the present invention describe a unitary barrel, chamber and action assembly (and associated manufacturing methodology) that uses a datum on a piece of metal stock to base all modifications, cuts, reams or profiling. Using a datum, exact measurement can be established so that precise headspace control can be achieved. Moreover the datum can be used as the basis and common reference point for all internal and external configuration profiling, reaming and, when necessary, subsequent modifications.

While there have been described above the principles of the present invention in conjunction with a unitary barrel, chamber and action assembly for a firearm, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A unitary firearm assembly, comprising:
   a piece of metal stock having a first hole of a first diameter, wherein the first hole includes a center axis;
   a datum perpendicular to the center axis;
   a second hole concentrically oriented about the central axis having a second diameter and a second hole depth measured from the datum and wherein the second diameter is larger than the first diameter;
   a third hole concentrically oriented about the central axis having a third diameter wherein the third diameter is greater than the first diameter and less than the second diameter, the third hole having a third hole depth measured from the datum wherein a difference between the third hole depth and the second hole depth forms a chamber equal to a predefined headspace.

2. The unitary firearm assembly of claim 1 wherein the third hole can be configured for rimless cartridges with the predefined headspace requirement measured from the datum.

3. The unitary firearm assembly of claim 1 further comprising a fourth hole concentrically oriented about the central axis having a fourth diameter wherein the fourth diameter is greater than the second diameter.

4. The unitary firearm assembly of claim 1 further comprising a set of locking lugs based on measurements from the datum configured to secure a forward face of a bolt at a forward action face.

5. The unitary firearm assembly of claim 1 wherein the piece of metal stock includes two or more index marks operable to consistently position the piece of metal stock on a plurality of machining tools.

6. The unitary firearm assembly of claim 1 wherein the second hole includes a forward action face operable to interface with a forward face of a bolt.

7. The unitary firearm assembly of claim 1 wherein the first diameter of the first hole is dimensioned to only receive a projectile.

\* \* \* \* \*